United States Patent
Song et al.

(10) Patent No.: US 8,908,634 B2
(45) Date of Patent: Dec. 9, 2014

(54) METHOD FOR CONTROLLING VCC FUNCTIONS INITIATED BY NETWORK AND TERMINAL AND NETWORK SERVER THEREOF

(75) Inventors: Jae-Seung Song, Seoul (KR); Kyung-Ae Yoon, Gyeonggi-Do (KR); Mi-Seon Ra, Seoul (KR); Hyun-Sook Kim, Seoul (KR); Hede Patrice, Enghien-les-bains (FR)

(73) Assignee: LG Electronics Inc., Seoul (KR)

( * ) Notice: Subject to any disclaimer, the term of this patent is extended or adjusted under 35 U.S.C. 154(b) by 1816 days.

(21) Appl. No.: 11/702,170

(22) Filed: Feb. 5, 2007

(65) Prior Publication Data

US 2008/0069085 A1 Mar. 20, 2008

Related U.S. Application Data

(60) Provisional application No. 60/765,213, filed on Feb. 6, 2006, provisional application No. 60/852,411, filed on Oct. 18, 2006.

(30) Foreign Application Priority Data

Dec. 28, 2006 (KR) .................. 10-2006-0137125

(51) Int. Cl.
*H04W 4/00* (2009.01)
*H04L 12/66* (2006.01)
*H04W 36/00* (2009.01)
*H04W 8/24* (2009.01)
*H04W 80/10* (2009.01)
*H04W 88/06* (2009.01)
H04L 29/06 (2006.01)

(52) U.S. Cl.
CPC .......... *H04W 8/245* (2013.01); *H04W 36/0022* (2013.01); *H04W 80/10* (2013.01); *H04W 88/06* (2013.01); *H04L 65/1016* (2013.01); *H04L 65/1083* (2013.01)
USPC ........... 370/331; 370/352; 370/353; 370/354; 370/355; 370/356; 455/436; 455/439; 455/442

(58) Field of Classification Search
CPC . H04W 36/0022; H04W 80/10; H04W 88/06; H04W 8/245; H04L 65/1016; H04L 65/1083
USPC ........... 370/352–356, 331; 455/436, 439, 442
See application file for complete search history.

(56) References Cited

U.S. PATENT DOCUMENTS 6,118,780 A 9/2000 Dunn et al.
6,212,380 B1 * 4/2001 Laatu ........................... 455/436

(Continued)

FOREIGN PATENT DOCUMENTS

EP       1 478 112 A2   11/2004
WO      WO-00/77988 A1  12/2000
WO      WO-01/72024 A1   9/2001

*Primary Examiner* — Luat Phung
*Assistant Examiner* — Kai Chang
(74) *Attorney, Agent, or Firm* — Birch, Stewart, Kolasch & Birch, LLP

(57) ABSTRACT

A method and terminal for controlling Voice Call Continuity (VCC) functions initiated by a network, are discussed. According to an embodiment, the method includes receiving, by a terminal, a VCC function notification message, the VCC function notification message including VCC enabling information indicating whether a VCC function of the terminal is to be enabled or disabled; and enabling or disabling the VCC function of the terminal based on the VCC function notification message.

2 Claims, 6 Drawing Sheets

(56) References Cited

U.S. PATENT DOCUMENTS

| | | |
|---|---|---|
| 7,603,433 B1 | 10/2009 | Paterik |
| 7,606,247 B2 * | 10/2009 | Song et al. .................... 370/401 |
| 7,912,041 B2 * | 3/2011 | Song et al. .................... 370/352 |
| 8,107,432 B2 * | 1/2012 | Seo ............................... 370/331 |
| 2004/0246933 A1 * | 12/2004 | Valko et al. ................... 370/338 |
| 2005/0202819 A1 | 9/2005 | Blicker |
| 2005/0259649 A1 | 11/2005 | Smith |
| 2006/0111135 A1 | 5/2006 | Gray et al. |
| 2006/0229093 A1 | 10/2006 | Bhutiani et al. |
| 2007/0014281 A1 * | 1/2007 | Kant ............................. 370/352 |
| 2007/0110075 A1 * | 5/2007 | Olvera-Hernandez ... 370/395.52 |
| 2007/0135146 A1 * | 6/2007 | Rezaiifar et al. .............. 455/466 |
| 2007/0149166 A1 * | 6/2007 | Turcotte et al. ............ 455/404.1 |
| 2007/0238467 A1 | 10/2007 | Buckley et al. |
| 2007/0238468 A1 * | 10/2007 | Buckley et al. ............... 455/445 |
| 2007/0254625 A1 * | 11/2007 | Edge ........................... 455/404.1 |
| 2008/0318565 A1 | 12/2008 | Stojanovski et al. |
| 2010/0034166 A1 * | 2/2010 | Olvera-Hernandez ........ 370/331 |

\* cited by examiner

METHOD FOR CONTROLLING VCC FUNCTIONS INITIATED BY NETWORK AND TERMINAL AND NETWORK SERVER THEREOF

The present application claims the priority benefits of U.S. Provisional Applications Nos. 60/765,213 and 60/852,411 respectively filed on Feb. 6, 2006 and Oct. 18, 2006, and also Korean Patent Application No. 10-2006-0137125 filed on Dec. 28, 2006 in Republic of Korea. The entire contents of these applications are herein fully incorporated by reference.

BACKGROUND OF THE INVENTION

1. Field of the Invention

The present invention relates to a Voice Call Continuity (VCC), and more particularly, to a method and system for controlling VCC functions initiated by a network in which the VCC functions are enabled or disabled by exchanging information regarding the VCC functions between a terminal and a network server. The present invention also relates to the terminal and network server for implementing the method.

2. Discussion of the Background Art

In general, a Voice Call Continuity (VCC) refers to a service for allowing a call path exchange of voice calls between a 3GPP Circuit Switching (CS) system (e.g., GSM, UMTS) and an IP Multimedia Subsystem (IMS). That is, the VCC refers to a type of application, namely, a home IMS application which is capable of transporting voice calls between the CS domain and IMS domain. As such, the VCC provides functions of voice call originations, voice call terminations, a domain selection and a domain transfer from the CS domain to the IMS domain or vice versa. Here, the domain transfer refers to transferring access legs for voice calls toward a User Equipment (UE) (i.e., a terminal) from the CS domain to the IMS domain or vice versa during an active session. The access leg denotes a call control leg between a VCC UE and a Domain Transfer Function (DTF) of a VCC application (server).

Through the domain transfer procedures of the VCC service, continuity for one or more voice sessions is provided between the IMS domain and CS domain while the VCC UE performs the one or more voice sessions. That is, the VCC services provides continuity to the voice call by switching from the IMS domain to the CS domain or vice versa, e.g., when the current domain for the call is not suitable or desired.

The domain transfer for a certain voice call/session from the CS domain to the IMS domain or vice versa is initiated only when a DTF is positioned (located) on a signal path of the voice call/session setup. For this, positioning of the DTF on the way of the signal path of the voice call/session setup is referred to as anchoring in IMS or anchoring.

FIG. 1 illustrates an architecture of a network for providing a VCC service.

As illustrated in FIG. 1, a VCC UE 10 denotes all types of terminals which can support the VCC service. The VCC UE can access the CS and PS (packet switched) domains. That is, when accessing the CS domain, the VCC UE uses a UE-CS (not shown) provided therein, whereas the VCC UE uses a UE-IMS (not shown) provided therein when accessing the PS domain.

A VCC application 30 is an application server for providing the VCC service, and is constituted with entities which perform a series of functions. The series of functions may include functions required to setup voice calls toward the VCC UE, and functions required to switch an access leg of the VCC UE between the CS domain and the IMS domain with maintaining (performing) an active session. Here, the series of functions can be, but are not limited to, a Domain Transfer Function 30a, a Domain Selection Function 30d, a CS Adaptation Function 30b, and a CAMEL Service Application 30c. Detailed capabilities and operations for the series of functions are described in 3GPP TS 23.206 V1.2.0.

Generally, the CS domain entities include a Visited Mobile Switching Center (VMSC) 24, a Gateway MSC (GMSC) 26, a gsmSCF, and the like. The IMS domain entities include a P-CSCF (Proxy Call Session Control Function), a S-CSCF (Serving Call Session Control Function) 20, a I-CSCF (Interrogating Call Session Control Function), a Media Gateway Control Function (MGCF) and a Home Subscriber Server (HSS) 40.

In order for the VCC UE to receive the VCC services, a registration procedure to the CS and IMS domains must previously be performed. In the related art VCC technology the CS registration and IMS registration which are associated with the VCC are as follows.

Specifically, a registration (or an attachment) to the CS domain is performed as the same as an existing registration to the CS domain. The registration to the IMS domain can be performed by the VCC UE only when an IP connectivity is available. The successive registration procedures are performed depending on a subscriber's iFC (initial Filter Criteria). The iFC refers to filter criteria which are a type of user information stored in the HSS. For a VCC subscriber, registration in a third party registration is defined to be performed to the VCC Application Server (VCC AS) 30 depending on the iFC.

FIG. 2 is a signal flowchart illustrating a procedure in which a VCC UE registers in an IMS domain according to the related art.

As illustrated in FIG. 2, a VCC UE 10 sends a REGISTER message to a S-CSCF 20 to initiate (start) a registration procedure (S1).

The S-CSCF 20 sends information related to a user of the VCC UE 10 to a HSS 40, thereby requesting subscriber information (represented as 'Cx-Put/Cx-Pull' in FIG. 2) (S2). The S-CSCF 20 receives the subscriber information from the HSS 40 (represented as 'Cx-Put/Cx-Pull Resp' in FIG. 2) (S3). The S-CSCF 20 then performs a service logic based upon the received subscriber information (e.g., using the iFC included in the subscriber information) to determine if the registration should be allowed (S4), and then selectively performs a third party registration procedure with the VCC AS 30 based on the determination result (S5). The VCC AS 30 delivers a 200 OK message to the VCC UE 10 via the S-CSCF 20 after the third party registration procedure is successfully performed (S6 and S7).

Once the VCC UE 10 completes the registration for the VCC service through steps S1 to S7, the network may adapt the following logic for calls associated with the VCC subscriber (i.e., the user of the VCC UE 10).

Call origination: when the corresponding VCC subscriber originates a call (i.e., when the call is an outgoing call), an anchoring in the IMS domain is performed for the VCC.

Call termination: when the network receives a call which the corresponding VCC subscriber terminates (i.e., when the call is an incoming call directed to the terminal), an anchoring in the IMS domain is performed for the VCC. A CS domain or IMS domain is selected (i.e., a domain selection is performed) and the call is terminated in the selected domain.

Domain selection: the corresponding VCC subscriber (i.e., the VCC UE user) selects the currently activated domain or the most suitable domain based upon operator policy.

Domain transfer: domain transfer for an ongoing call is initiated from a first domain to a second domain, e.g., from the CS domain to the IMS domain or vice versa.

As such, the VCC functions can be performed after the VCC UE 10 registers in the network (i.e., VCC AS 30). However, sometimes the VCC functions can not be supported or performed by the network due to particular conditions of the network, for example, network maintenance, traffic, a load of a specific external node, an internal problem of the VCC AS 30, or a temporary (or permanent) change of operator policies. In such cases, however, since there is no way or mechanism for the VCC UE 10 to know the fact that the VCC functions cannot be supported by the network according to the background art, the VCC UE 10 ends up performing or initiating unnecessarily or uselessly VCC related operations (e.g., domain selection for outgoing calls, or domain transfer therefor). This, from the perspective of the VCC UE 10, degrades the efficiency or capabilities of the VCC UE 10, e.g., it can result in a waste of resources, CPU power loss, battery consumption, radio access monitoring, or the like.

SUMMARY OF THE INVENTION

Therefore, it is an object of the present invention to control VCC functions between a network server and a terminal under the control of the network server, by sending information regarding the enabling or disabling status of the VCC functions of the network from the network server to the terminal.

It is another object of the present invention to provide a terminal, server, system and method for controlling VCC functions, which address the limitations and disadvantages associated with the background art.

It is another object of the present invention to provide a technique for a network server (e.g., VCC AS) to indicate to a terminal/UE whether the network can currently support or perform a VCC function.

It is still another object of the present invention to provide a technique for a terminal to communicate to a network server whether or not the terminal is VCC enabling, and for the network server to selectively perform a VCC function based on this communication.

To achieve these and other objects, there is provided according to an embodiment a method for controlling a voice call continuity (VCC) function, comprising: receiving, by a terminal, a VCC function notification message, the VCC function notification message including VCC enabling information indicating whether a VCC function of the terminal is to be enabled or disabled; and enabling or disabling the VCC function of the terminal based on the VCC function notification message.

According to another aspect, the present invention provides a terminal for controlling a voice call continuity (VCC) function, comprising: a receiver to receive a VCC function notification message, the VCC function notification message including VCC enabling information indicating whether a VCC function of the terminal is to be enabled or disabled; and a controller to enable or disable the VCC function of the terminal based on the VCC function notification message.

According to another aspect, the present invention provides a system for controlling a voice call continuity (VCC) function, comprising: a first network server configured to transmit a VCC function notification message to a terminal, the VCC function notification message including VCC enabling information indicating whether a VCC function of the terminal is to be enabled or disabled; and the terminal configured to enable or disable the VCC function of the terminal based on the VCC function notification message.

According to another aspect, the present invention provides a network server for controlling a voice call continuity (VCC) function, comprising: a transmitter to transmit a VCC function notification message, the VCC function notification message including VCC enabling information indicating whether a VCC function of a terminal is to be enabled or disabled; a receiver to receive a session initiation protocol (SIP)-based message including the VCC enabling information from the terminal; and a controller to selectively perform a VCC operation based on the VCC enabling information included in the SIP-based message.

According to another aspect, the present invention provides a network server for controlling a voice call continuity (VCC) function, comprising: a transmitter to transmit a VCC function notification message, the VCC function notification message including VCC enabling information indicating whether a VCC function of a terminal is to be enabled or disabled; a receiver to receive a session initiation protocol (SIP)-based message including the VCC enabling information from the terminal; and a controller to selectively perform an anchoring operation based on the VCC enabling information included in the SIP-based message.

According to another aspect, the present invention provides a network server for controlling a voice call continuity (VCC) function, comprising: a transmitter to directly transmit a VCC function notification message to a terminal, the VCC function notification message including VCC enabling information indicating whether a VCC function of a terminal is to be enabled or disabled; a receiver to directly receive a message including the VCC enabling information from the terminal; and a controller to selectively perform a VCC operation based on the VCC enabling information included in the message received by the receiver.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

Figure 1:
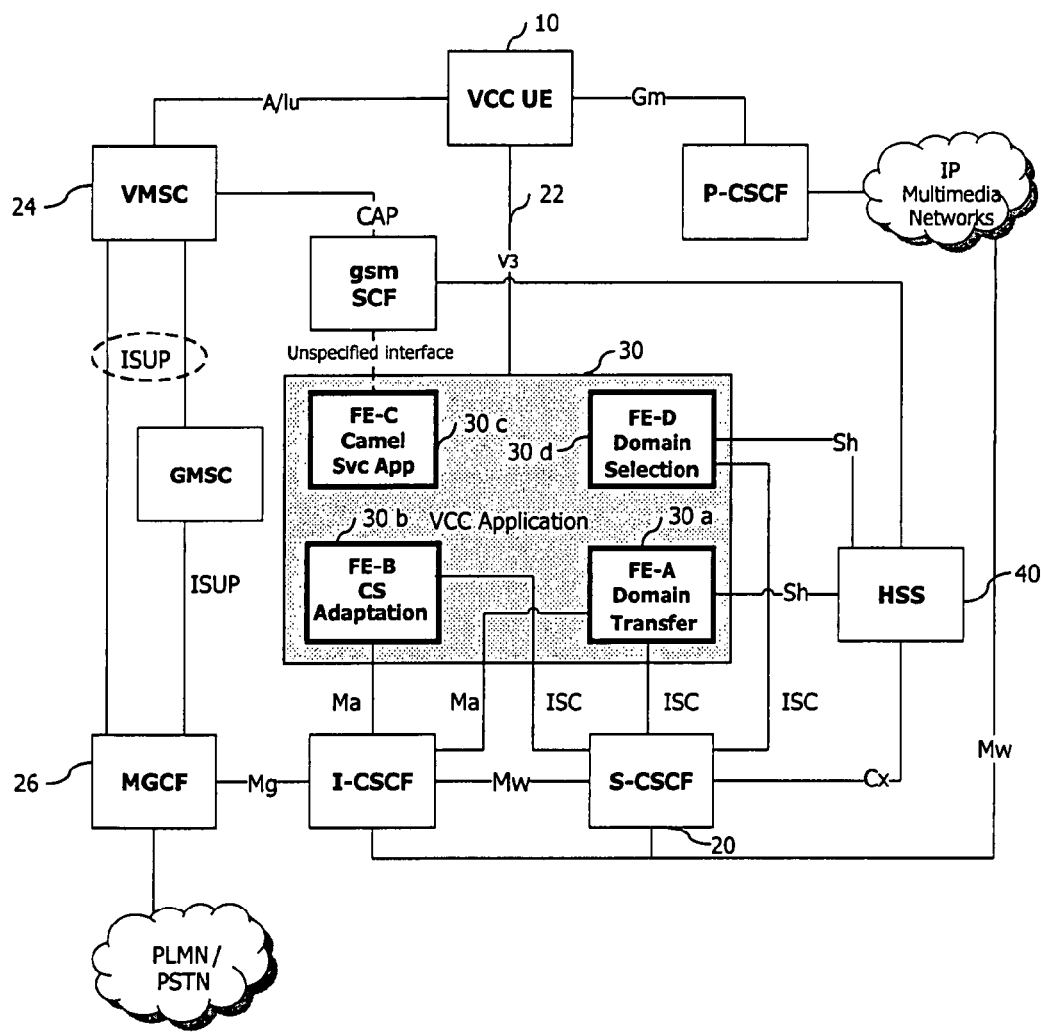
FIG. 1 is a network architecture for providing a VCC service, in which the present invention can be implemented.
Figure 2:
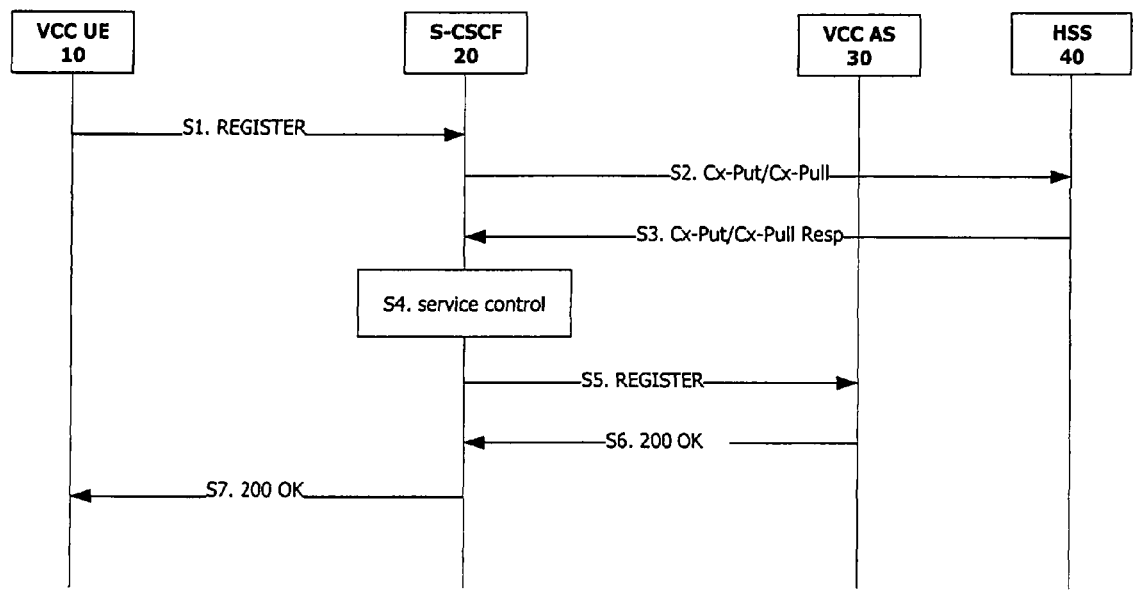
FIG. 2 is a signal flowchart illustrating a procedure in which a VCC UE registers in an IMS domain according to a background art.

The present invention is applicable to a Voice Call Continuity (VCC) field of 3GPP, and it may also be applicable to other communication fields.

Substantially in the present invention, a network server (i.e., a VCC application server (VCC AS)) controls when a VCC related operation is to be performed such that a terminal (VCC UE) changes a status of a VCC function from being enabled to being disabled, or vice versa. According to an embodiment of the present invention, in case where the network server can not perform VCC functions any more, namely, VCC related operations (e.g., domain selection, domain transfer, etc.) because of communication conditions of the network server, the network server sends to the terminal certain information related to the VCC functions for controlling the VCC functions. For instance, the network server sends a VCC function notification message including VCC enabling information indicating whether the VCC function of the terminal should be enabled or disabled (e.g., because the network cannot support the VCC function), to the terminal. The terminal then receives the VCC function notification message and sends to the network server information indicating whether the VCC functions of the terminal are enabled or disabled (i.e., VCC enabling information) based upon the received notification message. Then the network server receives the VCC enabling information from the terminal and updates an VCC active list based on the received enabling information. Based on the VCC active list (e.g., if the terminal/user is included in the VCC active list) and the VCC enabling/disabling status of the network, the VCC functions are performed between the network server and the terminal.

Hereinafter, terms used in the description of the preferred embodiments of the present invention will now be defined.

A UE according to the present invention may include all types of terminals which can employ (or support) the VCC services (i.e., VCC capable UEs). For instance, the UE according to the present invention comprehensively includes mobile communications terminals (e.g., UEs, mobile phones, cellular phones, DMB phones, DVB-H phones, PDAs, PTT, etc.) capable of employing (or supporting) VCC services, digital TV sets, GPS navigation devices, portable game machines, MP3, other home appliances, and the like. The present invention is described by using the term 'UE' which indicates a terminal. Also, in the present invention, a terminal which is capable of supporting (employing) the VCC is called a 'VCC UE' and a terminal which is not capable of supporting the VCC is called a 'VCC non-capable UE'.

The term 'VCC enabling information' which is sent from a VCC AS (or other network server) to a terminal in the present invention preferably corresponds to indication information provided to control enabling or disabling of VCC functions of the terminal. This VCC enabling information may be included in a body or header of a specific message (e.g., 'VCC function notification' message) sent from the network server to the terminal. The VCC enabling information can be a type of 1-bit indicator (e.g., called 'VCC Enable'), wherein the 1-bit value may be '0' or '1', or can be any other type of parameter.

The term 'VCC enabling information' which is sent from the terminal to the VCC AS in the present invention is preferably a type of indicator (information) indicating that the terminal is setting the VCC function to be enabled or disabled based upon the VCC enabling information received from the network server. Here, the VCC enabling information sent from the terminal to the VCC AS may be included (or inserted) in a specific message (e.g., a SIP based Re-REGISTER message, a SIP based INVITE message, a call setup message, or other type of SIP-based message).

According to the embodiments, the VCC enabling information sent from the VCC AS to the terminal and the VCC enabling information sent from the terminal to the VCC AS can be the same parameter (e.g., 'VCC Enable=0 or 1', 'VCC Enabling or Disabling', etc.) or different parameters. Using the same parameter is preferred, however, since the terminal need not generate a new parameter but can merely include the parameter (VCC enabling information) received from the VCC AS to send it to the VCC AS. When the VCC AS receives the same parameter from the terminal, the VCC AS interprets it to mean that the VCC function of the terminal has been enabled or disabled.

A technical term 'iFC' (initial Filter Criteria) used in the present invention preferably refers to filter criteria, a type of user information initially stored in a Home Subscriber Server (HSS). The iFC is downloaded to the S-CSCF when the user performs a registration procedure. The iFC may include information related to a VCC service subscription of the user, such that in the service logic procedure of the S-CSCF, the S-CSCF uses the iFC to determine whether or not the VCC registration procedure for the corresponding terminal should be performed with the VCC AS. The iFC may be included in VCC subscription information transmitted from the HSS to the S-CSCF.

Another technical term called 'V3 interface' used in the present invention preferably denotes an interface for a mutual information transfer between the terminal (i.e., VCC UE) and the VCC AS. For instance, the V3 interface is shown as 22 in FIG. 1 as an example. The V3 interface may be include a Ut interface, and an OMA DM (device management). That is, an information transfer from the UE to the VCC AS can be achieved by use of the Ut interface, whereas an information transfer from the VCC AS to the UE can be achieved by use of the OMA DM using a DM method. As another example, the V3 interface method may include an unstructured supplementary service data (USSD) method. The Ut interface, the DM method and the USSD method are known in the art. A protocol of the V3 interface may exemplarily be a HTTP, which has a XML format. The HTTP defines messages such as PUT, GET, DELETE, and the like.

Hereinafter, construction and operations of the preferred embodiments of the present invention will be explained in detail with reference to the accompanying drawings. The methods of the present invention discussed below in connection with FIGS. 3-5 can be implemented in the network architecture of FIG. 1 or in other suitable network architecture.

Figure 3:
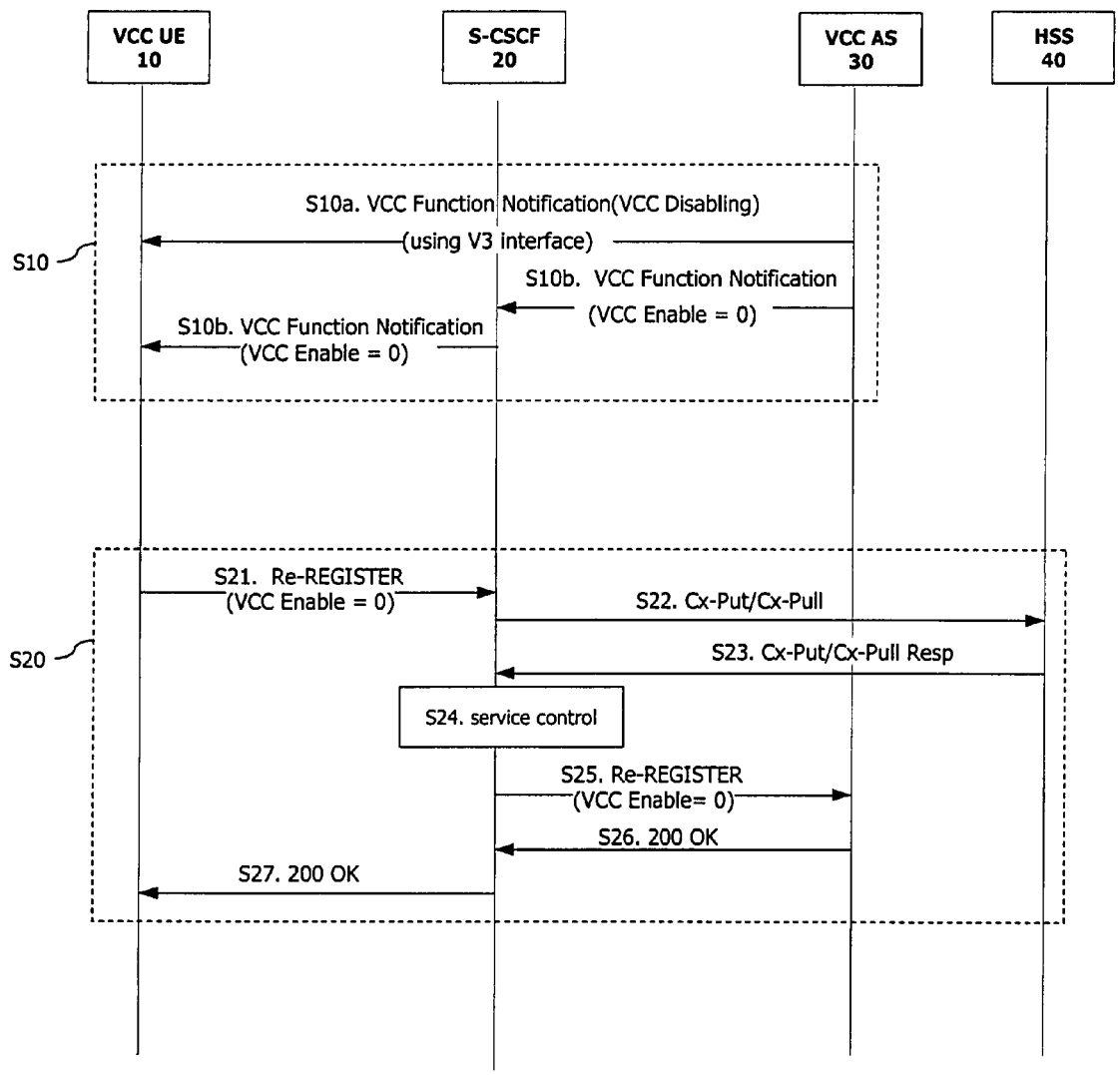
FIG. 3 is a flowchart illustrating a method for controlling VCC functions in a VCC initiated by a network according to a first embodiment of the present invention.

FIG. 3 is a diagram illustrating a method for controlling VCC functions in a VCC initiated by a network according to a first embodiment of the present invention. In the example of FIG. 3, it is assumed that the UE 10 is a VCC capable terminal, a user (i.e., a terminal user) has a VCC subscription, and a third party registration has been completed between the VCC UE 10 and the VCC AS 30.

The first embodiment of the present invention as shown in FIG. 3 may be implemented by two processes, namely, a first process (S10) of sending a VCC function notification from the VCC AS 30 to the VCC UE 10, and a second process (S20) of sending VCC enabling information from the VCC UE 10 to the VCC AS 30, based upon the VCC function notification received from the VCC AS 30, to thereby enable or disable a VCC Function.

As illustrated in FIG. 3, after completing a third party registration (i.e., registering the UE 10 in the VCC AS 30) between the VCC AS 30 and the VCC UE 10 via the S-CSCF 20, the VCC function for an incoming call (i.e., a call terminated in the terminal) or an outgoing call (i.e., a call originated in the terminal) may be performed. However, during this time in which the VCC function is to be performed between the VCC UE 10 and the VCC AS 30, the VCC AS 30 may not be able to perform the VCC functions, e.g., due to communication conditions of a network, exchange of operator policy, a VCC non-capability in a roaming state to the VCC UE 10, etc.

In this respect, the VCC AS 30 sends to the VCC UE 10 certain information (i.e., 'VCC enabling information') indicating whether or not the VCC function can be performed (which can also mean whether or not the VCC function of the terminal should be enabled or disabled) (S10). That is, the VCC enabling information is used by the UE 10 to set the VCC function to be enabling or disabling. The VCC function information is sent from the VCC AS 30 to the VCC UE 10 through a VCC function notification message. For instance, the VCC function notification message includes the VCC enabling information, and such VCC function notification message can be sent from the VCC AS 30 to the UE 10 before, during or after the registration through a V3 interface, a S-CSCF or other means.

In one example, the VCC function notification message may be transferred from the VCC AS 30 to the VCC UE 10 via the V3 interface 22 (S10a). That is, the VCC function notification message is sent from the VCC AS 30 to the UE 10 directly (e.g., without passing through the S-CSCF 20). In step S10a, the VCC function notification message may be formed in a XML format and may include a message tag indicating disabling of the VCC functions (e.g., 'VCC Disabling') or a message tag indicating enabling of the VCC functions (e.g., 'VCC Enabling'). Here, the parameters/tags such as 'VCC Disabling' and 'VCC Enabling' are considered to be the VCC enabling information. In another example, the VCC enabling information can be another type of parameter such as 'VCC Enable', and the value of this parameter 'VCC Enable' can indicate whether the VCC function is to be enabled or disabled. For instance, if "VCC Enable=0", then this indicates the VCC function is to be disabled, whereas if "VCC Enable=1", then this indicates the VCC function is to be enabled. Other values or parameter types can also be used.

Alternative to step S10a, the VCC function notification message may be sent from the VCC AS 30 to the VCC UE 10 via a SIP based method (S10b). In step S10b, the VCC function notification message may include the VCC enabling information represented using various parameters as discussed above in step S10a. For instance, a feature tag (e.g., 'VCC Enable') indicating enabling or disabling of the VCC functions may be provided in a body or header of the VCC function notification message. A value of the 'VCC Enable' feature tag may be set to '0' or '1'. If the 'VCC Enable' feature tag is '0' (i.e., "VCC Enable=0" in FIG. 3), the VCC AS 30 notifies the VCC UE 10 that the VCC functions can not be supported. On the other hand, if the 'VCC Enable' feature tag is '1' (i.e., "VCC Enable=1" (not shown in FIG. 3)), the VCC AS 30 notifies the VCC UE 10 that the VCC functions can be supported. The VCC function notification message, in step S10b, is sent from the VCC AS 30 to the VCC UE 10 via the S-CSCF 20.

The VCC UE 10 receives the VCC function notification message and checks (or analyzes) VCC function information included in the message. The VCC functions are selectively performed (performed or not performed) between the VCC UE 10 and the VCC AS 30 based upon the analysis of the VCC function information included in the notification message (S20).

In step S20, the VCC UE 10 receives the VCC function notification message including the VCC enabling information from the VCC AS 30, and thereafter performs a re-registration to the VCC AS 30. In another embodiment as shown in step S30 of FIG. 4, on the other hand, the VCC UE 10 receives the VCC function notification message including the VCC enabling information from the VCC AS 30 and thereafter sends indication information (VCC enabling information) for enabling or disabling VCC functions between the VCC UE 10 and the VCC AS 30 through a session invitation message (e.g., a SIP based INVITE message).

If recognizing that the network cannot currently perform the VCC functions by analyzing 'the VCC function information' included in the 'VCC function notification' message received by VCC UE (10) in the above step (S10) (that is, "VCC Disable" message tag or 'VCC Enable =0'), the VCC UE (10) (concretely, UE-CS) can send 'VCC enable information' to CS domain, no IMS domain, via a call setup message. At this time, the VCC enable information can be included in the call setup message or be combined with the call setup message. That is, the VCC enable information can be implemented in one of the parameter (or the element) within the call setup message and be transmitted as independent information with the call setup message.

Hereinafter, step S20 of FIG. 3 according to one example will be explained.

If the UE 10 recognizes that the network is not currently capable of performing the VCC function after analyzing the VCC enabling information (e.g., "VCC Enable=0") included in the received VCC function notification message, the VCC UE 10 performs a re-registration procedure to the VCC AS 30 and then sends to the VCC AS 30 information (VCC enabling information) indicating disabling of the VCC functions.

That is, the VCC UE 10 sends a SIP based Re-REGISTER message to the S-CSCF 20 (S21). The Re-REGISTER message may have information indicating enabling or disabling of the VCC functions. Here, the information indicating the enabling or disabling of the VCC functions may be sent, as a type of indicator, by use of a 'VCC Enable' feature tag. The 'VCC Enable' feature tag may be included in a body or header of the 'Re-REGISTER' message. A value of the 'VCC Enable' feature tag can be set to '0' or '1'. If the 'VCC Enable' feature tag has a value of '0', it means that the VCC UE 10 notifies the VCC AS 30 it would disable (or has disabled) the VCC functions. Alternatively, if the 'VCC Enable' feature tag has a value of '1', it means that the VCC UE 10 notifies the VCC AS 30 it would enable (or has enabled) the VCC functions. Accordingly, the VCC UE 10 includes the VCC enabling information within a body or header of the 'Re-REGISTER' message which is to send to the S-CSCF 20. Here in this example, the value of the 'VCC Enable' feature tag is set to '0' indicating that the VCC function of the UE 10 is disabled, which corresponds with the VCC enabling information (S10) from the VCC AS 30 indicating that the network cannot support the VCC function and thus the terminal's VCC function should be disabled.

After receiving the Re-REGISTER message, the S-CSCF 20 checks whether the user of the UE 10 has a VCC subscription through a Home Subscriber Server (HSS) 40 by using information regarding the user of the VCC UE 10 included in the Re-REGISTER message. That is, the S-CSCF 20 sends a subscriber information request message (represented as 'Cx-Put/Cx-Pull' in FIG. 3) to the HSS 40 (S22). Here, the subscriber information request message may include the information regarding the user of the VCC UE 10.

The HSS 40 sends a User Profile (subscription information) to the S-CSCF 20 through a subscriber information response message (represented as Cx-Put/Cx-Pull Resp' in FIG. 3) in response to the subscriber information request message (S23). Here, the user profile may include iFC which has VCC service subscription information with respect to the user of the VCC UE 10.

The S-CSCF 20 checks, through steps S22 and S23, that the user of the VCC UE 10 has the VCC service subscription. The S-CSCF 20 stores the user profile received from the HSS 40 in a particular memory. The S-CSCF 20 performs a service logic so as to execute a so-called 'third party registration' procedure for a VCC service between the VCC UE 10 and the VCC AS 30 depending on the iFC (S24). Here, since the user of the VCC UE 10 has the VCC subscription, the iFC includes contents (or information) indicating that the user has the VCC subscription and accordingly a registration session should be sent to the VCC AS 30.

Depending on the iFC included in the user profile, the S-CSCF 20 performs the third party registration to the VCC AS 30 (S25 and S26). In this example, since step S24 indicates that the user has the VCC subscription, the S-CSCF 20 sends a SIP based 'Re-REGISTER' message to the VCC AS 30 (S25) where the Re-REGISTER' message preferably includes the 'VCC Enable' feature tag having a value set to '0'. For instance, the S-CSCF 20 can transmit the same Re-Register message received from the UE 10 to the VCC AS 30 if step S24 indicates that the VCC re-registration is allowed. If step S24 indicates otherwise, the S-CSCF 20 may not transmit the Re-Register message or the VCC enabling information to the VCC AS 30.

The VCC AS 30 then analyzes the received Re-REGISTER message to check the inclusion of the VCC enabling information (e.g., VCC Enable=0). In this example, the VCC AS 30 finds it out the 'VCC Enable' feature tag has been set to '0' within the Re-REGISTER' message. Accordingly, the VCC AS 30 updates (or deletes) the information related to the corresponding subscriber (i.e., the user of the VCC UE 10) which it stores, and thereby determines the VCC functions can not be supported to the VCC UE 10. For instance, the VCC AS 30 updates its VCC active user list (which indicates its list of active VCC users or UEs) based on the received VCC enabling information by removing the current user/UE from the VCC active user list. The VCC AS 30 performs VCC operations by referring to the VCC active user list. For instance, if the user or UE is in the list, then the VCC AS 30 performs a VCC operation whereas if the user or UE is not in the list, then the VCC AS 30 does not perform a VCC operation.

After step S25, the VCC AS 30 sends a response message (e.g., 200 OK) to the S-CSCF 20 in response to the Re-REGISTER message (S26). The S-CSCF 20 sends the receiver 200 OK message to the VCC UE 10 (S27).

Figure 4:
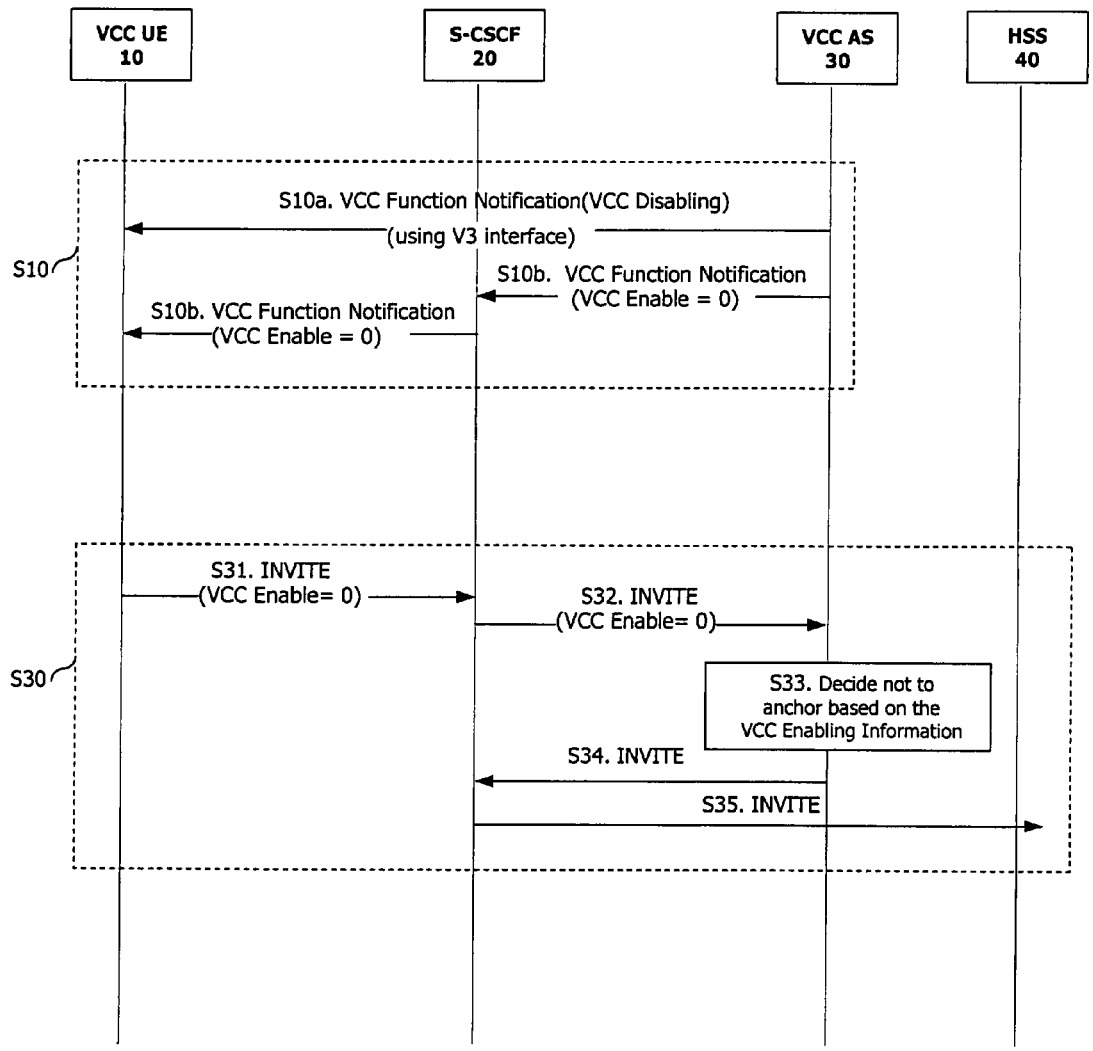
FIG. 4 is a flowchart illustrating a method for controlling VCC functions in a VCC initiated by a network according to a second embodiment of the present invention.

FIG. 4 is a diagram illustrating a method for controlling VCC functions in a VCC initiated by a network according to a second embodiment of the present invention. It is assumed in the example of FIG. 4 that the UE 10 is a terminal capable of employing VCC service (i.e., a VCC capable terminal), the user (i.e., the terminal user) has a VCC subscription, and the third party registration has been completed between the VCC UE 10 and the VCC AS 30.

The second embodiment of the present invention as shown in FIG. 4 can be implemented by two different processes like the first embodiment of FIG. 3, namely, a first process (S10) in which the VCC AS 30 sends VCC enabling information to the UE 10, and a second process (S30) in which the VCC UE 10 sends the VCC enabling information to the VCC AS 20 to enable or disable the VCC functions based upon the VCC enabling information received from the VCC AS 30. The first process (S10) of FIG. 4 is the same as the process (S10) of FIG. 3, whereas the second process (S30) of FIG. 4 is different from the second process (S20) of FIG. 3. That is, after performing the first process (S10) of FIG. 3 or FIG. 4, the second process (S20 of FIG. 3 or S30 of FIG. 4) may optionally be performed by the user (or depending on operator polices) according to communication conditions or user's preferences (or circumstances). For instance, the second process (S20) of FIG. 3 may be applicable when the VCC UE 10 needs to perform the re-registration procedure with the VCC AS 30, whereas the second process (S30) of FIG. 4 may be applicable when the UE 10 initiates a session.

The first process (S10) of FIG. 4 is the same as that of FIG. 3, and thusly the explanation of the process (S10) of FIG. 3 can be repeated therefore. Regardless, it should be clearly understood that step S10 in FIGS. 3 and 4 can be performed before or after the third party registration procedure.

Hereinafter, step S30 of FIG. 4 according to one example will be explained.

After recognizing that the network can not currently perform the VCC functions by analyzing the VCC enabling information included in the received VCC function notification message (e.g., 'VCC Disabling' message tag or 'VCC Enable=0'), the VCC UE 10 can send information indicating disabling of the VCC functions (i.e., VCC enabling information such as VCC Enable=0) to the VCC AS 30 through a SIP based INVITE message for a session or call setup.

Figure 5:
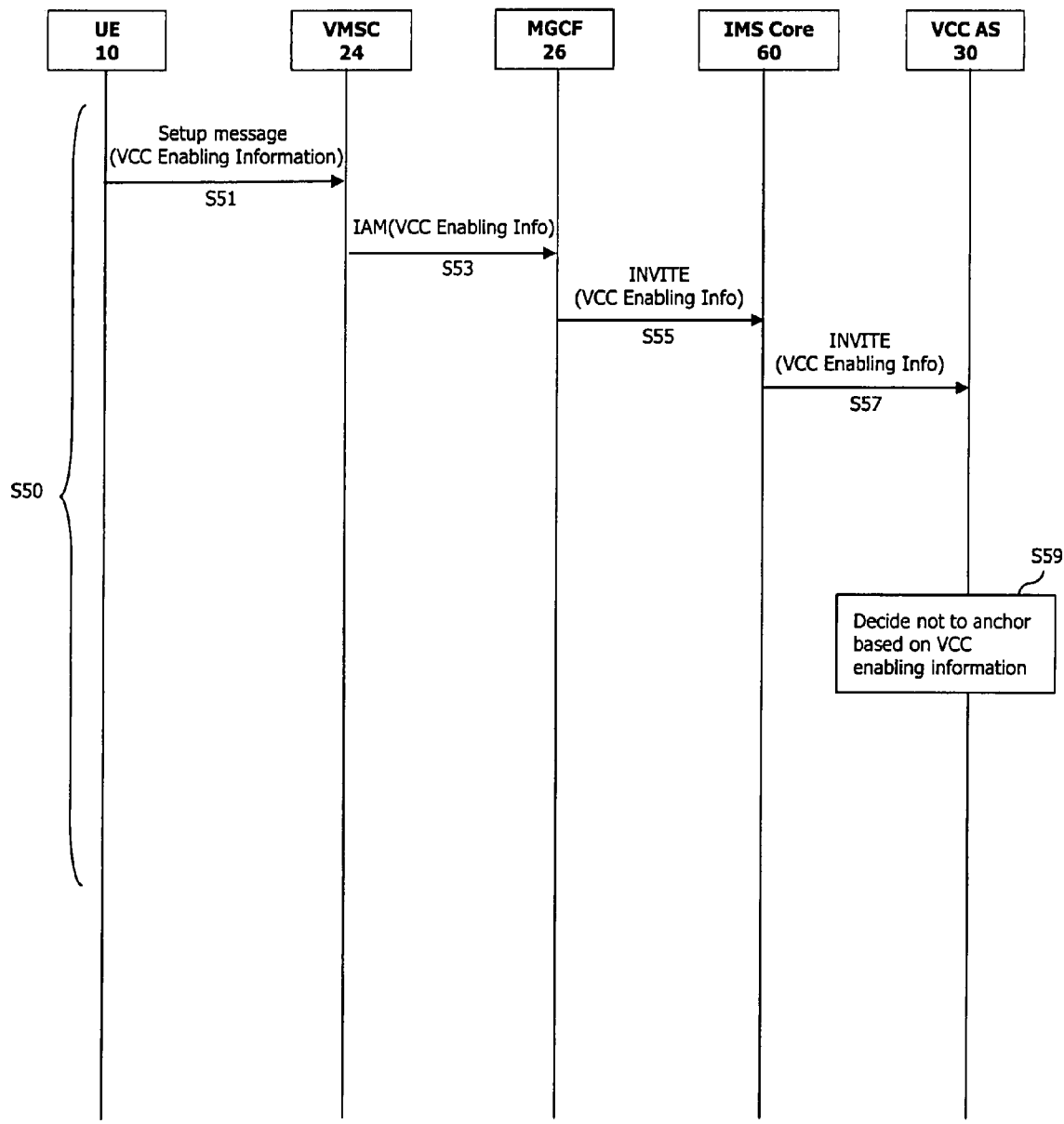
FIG. 5 is a flowchart illustrating a method for controlling VCC functions in a VCC initiated by a network according to another example of the present invention.

That is, the VCC UE 10 initiates a session by sending the INVITE message (i.e., corresponding to an IMS as shown in FIG. 4) or a setup message (i.e., corresponding to a CS as shown in FIG. 5 to be discussed later) for a session setup/call setup. In this respect, the VCC UE 10 sends the INVITE message to the S-CSCF 20 by setting the 'VCC Enable' feature tag for disabling the VCC functions to '0' in a body or header of the INVITE message. For enabling the VCC functions, the VCC UE 10 sends the INVITE message to the S-CSCF 20 by setting the 'VCC Enable' feature tag to '1' in the body or header thereof.

The S-CSCF 20 then sends the received INVITE message to the VCC AS 30 depending on the iFC (S32).

The VCC AS 30 analyzes the received INVITE message to check the value of the 'VCC Enable' feature tag included in the INVITE message (i.e., VCC Enable=0), thereby updating the VCC functions to be disabled. For instance, the VCC AS 30 may update its VCC active user list based on the VCC enabling information received from the UE 10. Accordingly, when the VCC AS 30 considers performing the VCC functions to the VCC UE 10 or from the VCC UE 10, it takes into account the updated VCC enabling information (i.e., VCC Enable=0 provided in the INVITE message). For example, when the VCC UE 10 requests a domain transfer for an outgoing call (or session), the VCC AS 30 decides whether to anchor the outgoing call with reference to the received VCC enabling information (i.e., VCC Enable=0) (S33). Here, the VCC AS 30 can decide whether or not the anchoring for a VCC operation should be performed by taking the 'VCC Enable' feature tag into account. Hence, in this example, since the 'VCC Enable' feature tag has a value set to '0', the VCC AS 30 decides not to anchor the outgoing call (or session). However, if the 'VCC Enable' feature tag has a value set to '1', the VCC AS 30 decides to anchor the outgoing call (or session).

In this example, the VCC AS 30 performs the outgoing call (or session) to a counterpart (B-part or terminating party) by sending the INVITE message via the S-CSCF 20 without anchoring the outgoing call (or session) (S34 and S35). That is, since the outgoing call or session is set as same as the general IMS session setup, after setting up the session, the VCC functions (e.g., domain transfer) may not be performed while the session is initiated.

As a variation, step S30 in FIG. 4 (session initiation in the IMS) can be replaced with step S50 of FIG. 5 (call setup in the CS domain). Referring to FIG. 5, a UE 10 transmits a call setup message to a visited mobile switching center (VMSC) 24, where the call setup message includes the VCC enabling information which indicates whether the VCC function of the UE 10 is enabled or disabled (S51). Then the VMSC 24 generates and transmits an initial address message (IAM) message including the VCC enabling information from the mobile switching center to a media gateway control function (MGCF) 26 (S53). The MGCF 26 converts the received IAM message (CS signal) to an INVITE message (IMS signal) and transmits the INVITE message to an VCC AS 30 through an IMS core 60 (S55 and S57). The INVITE message also includes the VCC enabling information. The IMS core 60 can include a P-CSCF (Proxy Call Session Control Function), a S-CSCF(Serving Call Session Control Function) 20, a I-CSCF (Interrogating Call Session Control Function), etc. Then the VCC AS 30 decides whether or not to perform an anchoring operation in response to the INVITE message based on the VCC enabling information included in the INVITE message (S59). Step S59 is the same as or similar to step S33 of FIG. 4.

In step S50 of FIG. 5 and step S30 of FIG. 4, the present invention includes the VCC enabling information in a known INVITE message for a session initiation (S30) or a known CS call setup message (S50) based on the VCC enabling/disabling status of the network. Also, it has been discussed above that the terminal includes the VCC enabling information in a Re-REGISTER message, an INVITE message or a Setup message and transmits this message to the VCC AS, the invention is not limited thereto and can include the VCC terminal in other SIP-based messages when sending it from the terminal to the VCC AS.

Also, in the above examples, the VCC functions are controlled by the VCC AS 30_through the series of steps S10 and S20, or S10 and S30, or S10 and S50. Accordingly, since the network server (e.g., VCC AS) sends VCC enabling information to the terminal and based on that information, the terminal can send the same or similar VCC enabling information to the network server, the network server can always correctly decide whether or not to perform a VCC operation with the terminal in a resource-efficient manner.

Hereinafter, construction and operations of a terminal and a network server (e.g., the VCC AS) according to the present invention will be explained.

The terminal (e.g., UE 10) according to the present invention may include a basic hardware construction which is required to receive the VCC enabling information from the network server (e.g., VCC AS 30) through a VCC function notification message, analyze and process the VCC enabling information, and then send a response message to the network server in response to the VCC function notification message. The response message preferably can include the VCC enabling information indicating to the VCC AS that the VCC function of the terminal is enabled or disabled.

Figure 6:
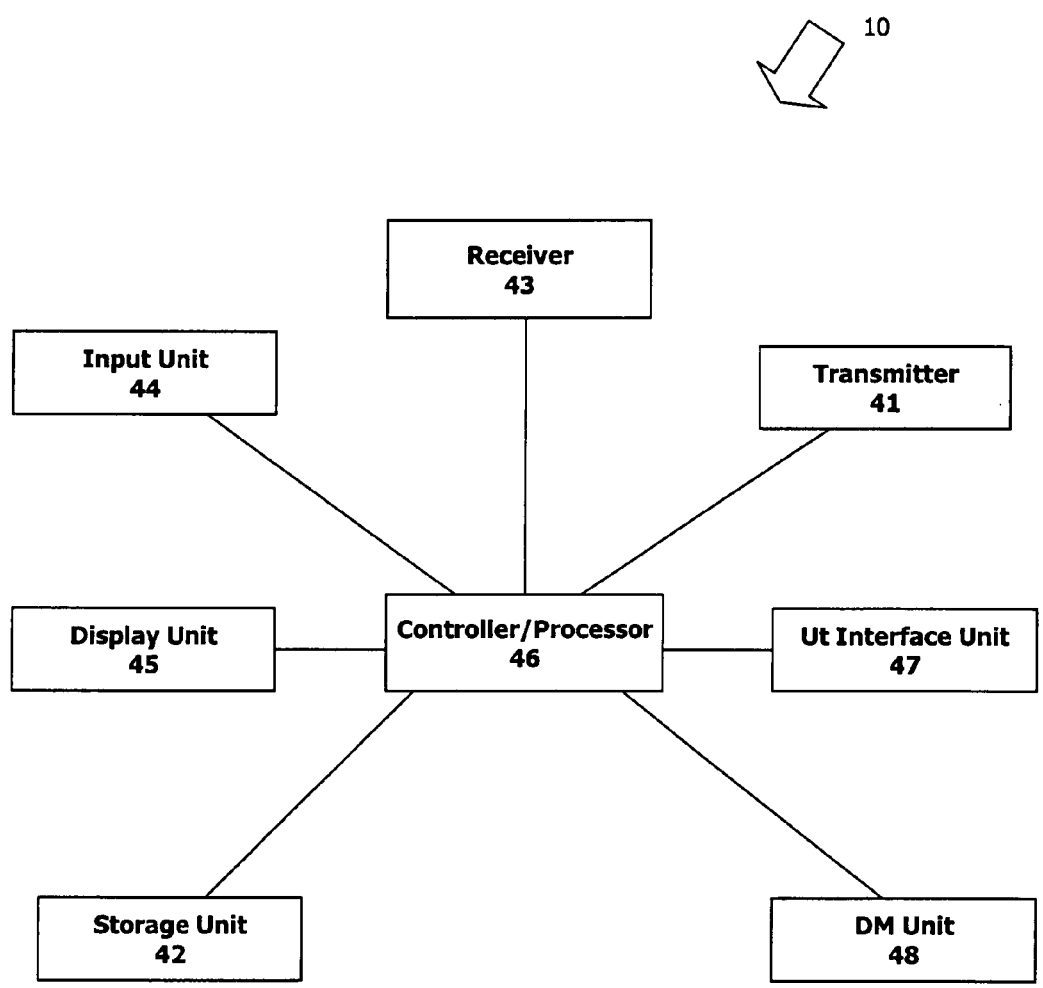
FIG. 6 is a block diagram of a terminal according to an embodiment of the present invention.

FIG. 6 shows a block diagram of a terminal (e.g., UE 10) according to an embodiment of the present invention. The methods of the present invention to be performed by the terminal can be performed by the terminal of FIG. 6.

Referring to FIG. 6, the terminal 10 according to the present invention may be provided with a receiver 43 for receiving the VCC function notification message including the VCC enabling information, a processor 46 for analyzing the received VCC function notification message to set the VCC functions to be enabled or disabled, and a transmitter 41 for sending to the network server information indicating the VCC functions are enabled or disabled in response to the VCC function notification message. The processor 46 may be implemented as a type of controller. The terminal 10 may also include other components such as a Ut interface unit 47, a DM unit 48, an input unit 44, a display unit 45, a storage unit 42 (e.g., for storing operator policy, user preferences, VCC enabling information received from the VCC AS, etc.)

As aforementioned, operations and functions of each component of the terminal which includes the technical features of the present invention have been described. However, it is obvious to those skilled in the art that other components of the terminal may also be provided to receive VCC services, explanation of which will be omitted.

Also, the network server such as the VCC AS according to the present invention may include a transmitter for sending VCC enabling information to the terminal through the VCC function notification message, and a receiver for receiving VCC enabling information (i.e., information indicating enabling or disabling of the VCC functions) which is sent by the terminal through a specific message (e.g., 'Re-REGISTER' message or INVITE message or Setup message) in response to the VCC function notification message. The transmitter of the network server sends to the S-CSCF a response message (e.g., 200 OK) or INVITE message with respect to the specific message which includes the VCC enabling information.

The network server according to the present invention may further include a determining unit for determining or confirming whether the VCC function should be enabled or disabled by analyzing the VCC enabling information included in the specific message, and a VCC enabler for performing or not performing VCC related operations with respect to the terminal according to the determination to enable or disable the VCC functions. Here, the determining unit may be implemented as a type of controller.

As described above, the embodiments illustrated in the drawings have been explained, but they are just exemplary. It could be understood by those skilled in the art that various changes and modifications and other equivalent embodiments are available. For example, when the VCC UE 10 can be re-allowed to perform the VCC functions due to improvement of communication conditions even after performing steps S10 and S20 (FIG. 3), or S10 and S30 (FIG. 4), or S10 and S50 (FIG. 5), the VCC AS 30 can send to the VCC UE 10 the VCC enabling information (e.g., VCC Enable=1) through step S10 in order to enable the VCC function which was previously disabled. The VCC UE 10 can send to the VCC AS 30 the information indicating the enabling of the VCC function, namely, send the VCC enabling information (e.g., VCC Enable=1), through step S20 or S30 or S50. Explanation will be given with reference to FIG. 3 of a signal path for exchanging the VCC enabling information (e.g., VCC Enable=1) between the VCC UE 10 and the VCC AS 30, and operations thereof. In other words, under a state that the VCC UE 10 initially registers in the network by setting the VCC functions to be enabled, if the VCC UE 10 has changed the status of the VCC function from being enabled to being disabled by the request of the network, when the network condition then becomes better, the VCC functions which were previously disabled can be controlled to be enabled between the VCC UE 10 and the network. Accordingly, the present invention should be construed broadly within its spirit and scope as defined in the appended claims.

As described so far, the present invention can be effective and advantageous since when a change in the communication conditions of the network does not allow the network server to perform (or not perform) the VCC functions (or VCC related operations) temporarily or permanently, the network server can control the terminal to enable or disable the VCC functions of the terminal appropriately by transmitting VCC enabling information.

In addition, in the present invention, the terminal is not required to unnecessarily perform the VCC functions, because it receives information for controlling the VCC functions to be enabled or disabled from the network server. Therefore, the present invention effectively and advantageously prevents a waste of resources in performing VCC functions unnecessarily, CPU power loss, battery consumption, useless radio access monitoring, etc.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method for controlling a voice call continuity (VCC) function by a terminal, the method comprising:

receiving, by a terminal, a feature tag indicating whether or not a VCC application server (VCC AS) currently supports a VCC function, wherein the feature tag is transmitted from the VCC AS when an operator policy related to the VCC function is changed;

enabling or disabling, by the terminal, a corresponding VCC functionality of the terminal based on the received feature tag, wherein the corresponding VCC functionality of the terminal is enabled if the feature tag indicates the VCC AS currently supports the VCC function, and the corresponding VCC functionality of the terminal is disabled if the feature tag indicates the VCC AS currently does not support the VCC function;

determining, by the terminal, a domain for transmitting VCC enabling information which indicates whether the corresponding VCC functionality of the terminal is enabled or disabled, between a circuit switching (CS) domain an IP multimedia subsystem (IMS) domain;

transmitting a call setup message from the terminal to a mobile switching center, the call setup message including the VCC enabling information which indicates whether the VCC functionality of the terminal is enabled or disabled;

transmitting an initial address message (IAM) message including the VCC enabling information from the mobile switching center to a media gateway controller;

transmitting an invite message including the VCC enabling information from the media gateway controller to the VCC AS through an IMS core; and selectively performing, by the VCC AS, an anchoring operation in response to the invite message based on the VCC enabling information included in the invite message, wherein the CS domain is selected for transmitting the VCC enabling information when the feature tag indicates the VCC AS currently does not support the VCC function;

wherein the VCC enabling information is transmitted, by the terminal, via the determined domain, wherein an outgoing call or session from the terminal is not anchored by the VCC AS, when the VCC enabling information indicates that the corresponding VCC functionality of the terminal is disabled, and wherein a domain transfer is not performed when the outgoing call or session is not anchored by the VCC AS.

2. The method of claim 1, wherein the VCC function includes at least one of the domain transfer operation and a domain selection operation.

* * * * *